United States Patent
Ikeda et al.

(10) Patent No.: US 7,183,738 B2
(45) Date of Patent: Feb. 27, 2007

(54) MOTOR CONTROL DEVICE

(75) Inventors: Hidetoshi Ikeda, Tokyo (JP); Tomohiro Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 112 days.

(21) Appl. No.: 10/511,908

(22) PCT Filed: Dec. 25, 2003

(86) PCT No.: PCT/JP03/16760

§ 371 (c)(1),
(2), (4) Date: May 20, 2005

(87) PCT Pub. No.: WO2005/064781

PCT Pub. Date: Jul. 14, 2005

(65) Prior Publication Data

US 2005/0200327 A1    Sep. 15, 2005

(51) Int. Cl.
*G05B 1/02* (2006.01)

(52) U.S. Cl. .............. 318/607; 318/632; 318/609; 318/432; 318/629; 318/638; 318/615

(58) Field of Classification Search .......... 318/609, 318/632, 607, 432, 638, 615; 310/316.02
See application file for complete search history.

(56) References Cited

U.S. PATENT DOCUMENTS

| 5,767,609 A | * | 6/1998 | Suganuma | ............ 310/316.02 |
| 2003/0184251 A1 | * | 10/2003 | Oyama et al. | ............... 318/607 |

FOREIGN PATENT DOCUMENTS

| JP | 2000-322105 A | 11/2000 |
| JP | 2001-333588 A | 11/2001 |
| JP | 2003-271246 A | 9/2003 |

* cited by examiner

*Primary Examiner*—Karen Masih
(74) *Attorney, Agent, or Firm*—Sughrue Mion, PLLC

(57) ABSTRACT

A speed control means 7 for outputting a drive command signal for a motor 1 to make the speed of the motor 1 conform to the speed command signal based on a signal indicating the difference between the speed command signal and the detected speed of the motor; a filter 13 inserted in series with the speed control means 7 in the speed control loop, having a high frequency domain, a low frequency domain, and an intermediate frequency domain between the high frequency domain and the low frequency domain, a gain KL in the low frequency domain being larger than a gain KH in the high frequency domain, and having a phase lag characteristic so that the phase in the intermediate frequency domain is delayed; the speed control means 7 having a proportional controller 9 that multiplies input by a proportional gain KP and outputs the result, and the filter 13 being set so that phase lag occurs between a resonance frequency and an anti-resonance frequency of a mechanical system.

9 Claims, 8 Drawing Sheets

MOTOR CONTROL DEVICE

BACKGROUND ART

FIG. 6 is a conceptual view of the configuration of a generally used conventional speed control device for a motor. In the figure, reference numeral 1 denotes a motor, reference numeral 2 denotes a load driven by the motor, and reference numeral 3 denotes an axle connecting the motor 1 and the load 2. The load 2 represents a moveable member of a machine driven by the motor 1, modeled as an inertial load, and the axle 3 models a mechanism for transmitting torque, generated by the motor 1, to the machine. Reference numeral 4 denotes an encoder, attached to the motor 1, for detecting the position of the motor 1, reference numeral 5 denotes a speed detection means for computing motor speed by differentiating the motor position detected by the encoder 4. Reference numeral 6 is a comparator for comparing a speed command signal given by a high-level controller (not illustrated in the figure) with the motor speed output by the speed detection means 5, and for outputting the difference between these two speeds as a speed error. Reference numeral 7 is a speed control means that, with the speed error output by the comparator 6 as input, outputs an electrical current command that is a motor drive command. Reference numeral 8 is an electrical current control means that, by controlling the motor electrical current based on the electrical current command output by the speed control means 7, generates torque in the motor and rotates the motor.

The speed control means 7 is composed of a proportional controller 9, an integral controller 10, and an adder 11. The proportional controller 9 multiplies the input speed error by proportional gain KP and outputs the result; and the integral controller 10 multiplies the integral value of the speed error by integral gain KI and outputs the result. The adder 11 adds the proportional controller 9 output and the integral controller 10 output, and outputs the result as the electrical current command. Reference numeral 15 is a mechanical system and is comprised of the motor 1, the load 2, and the axle 3.

A conventional speed control system is configured as described above; the torque for accelerating or decelerating the motor 1 is generated so that the speed error, being the difference between the speed command signal and the motor speed, becomes small, and thus the motor 1 and the load 2 rotate so that the motor speed follows the speed command signal given by the high-level controller. In cases where disturbing torque acts in the mechanical system, the motor speed fluctuates due to the disturbing torque; however, this speed fluctuation is detected by the encoder 4 and the speed detection means 5, is fed back to the speed control means 7, and an electrical current command is generated to correct the speed fluctuation. In this way, even in cases where disturbing torque acts, the speed fluctuations are restrained by a speed control loop, and the motor is controlled so as to follow the speed command signal.

FIG. 7 illustrates frequency response for an open speed loop in a configuration for a speed control system using a conventional speed control device. Frequency response for a speed open-loop are frequency response from the input of the speed control means 7 to the motor speed detected by the speed detection means 5; the upper graph in FIG. 7 illustrates gain characteristics and the lower graph illustrates phase characteristics. The broken lines in the figure illustrate frequency response for cases where the rigidity of the axle 3 connecting the motor 1 and the load 2 is high, that is, the mechanical rigidity is high. The full lines illustrate frequency response for cases of mechanical resonance, where the mechanical rigidity is low because the rigidity of the axle 3 is low.

Gain characteristics for cases where the mechanical rigidity is high (the rigidity of the axle 3 is high), as illustrated by the broken line in the upper graph of FIG. 7, drop down towards the right, over all frequencies. As illustrated by the broken line in the lower diagram of FIG. 7, at high frequencies, phase lags become large due to phase lags resulting from the sample period of the electrical current control means 8 or the control device; and at low frequencies, phase lags also become large due to using the integral controller 10 in the speed control device 7.

On the other hand, in cases where the mechanical rigidity is low (the rigidity of the axle 3 is low), the mechanical system has a mechanical resonance, and, as illustrated by the full line in the upper diagram of FIG. 7, its gain characteristic has a resonance referred to as a peak and an anti-resonance referred to as a trough. Since the gain decreases to the left, between resonance and anti-resonance, the gain at low frequencies becomes small in comparison to cases where the rigidity of the axle 3 is high (the broken line). As the inertial moment J of the whole mechanical system, being the sum of the inertial moment of the motor 1 and the inertial moment of the load 2, becomes large in comparison to the inertial moment JM of the motor, the distance between the resonance and the anti-resonance increases and the frequency of the anti-resonance becomes low, so that the low frequency gain becomes even smaller.

In order to realize high accuracy speed control, it is necessary to curb the influence of the disturbing torque that is one of the causes of the speed error, and to make small the speed fluctuations when the disturbing torque acts. In general, since the disturbing torque has low frequency signal components, in order to make small the speed fluctuations due to the disturbing torque, it is necessary to enlarge the gain at low frequencies. However, with machines having low rigidity, since the gain is small at low frequencies as described above, the speed fluctuations due to the disturbing torque become large and high accuracy control becomes difficult.

To enlarge the gain at low frequencies in the conventional speed control devices illustrated in FIG. 6, it is necessary to enlarge the proportional gain KP and the integral gain KI of the speed control means 7. However, there is a limit to this, and ultimately high accuracy control could not be realized. The reason for this is explained below. In FIG. 7, the frequency, where the gain characteristic for low rigidity cases (full line) intersects the line for 0 db gain at frequencies lower than the anti-resonance frequency, is a first crossover frequency ωC1, and the frequency where it intersects the line for 0 db gain at frequencies higher than the resonance frequency is a second crossover frequency ωC2. In order that the control system operates stably without causing vibrations or oscillating, it is necessary that the speed open-loop frequency characteristic phase lags be small for the first crossover frequency ωC1 and the second crossover frequency ωC2. However, when the proportional gain KP is made large, since the second crossover frequency ωC2 shifts to the high frequency side, the phase lag for the second crossover frequency ωC2 becomes large and the control system ends up vibrating and oscillating. When the integral gain KI is made large, since the phase lag at low frequencies due to the integral controller 10 becomes large, the phase lag for the first crossover frequency ωC1 becomes large, and the control system ends up vibrating and oscillating. In this way, since for the conventional speed control device it is not possible to enlarge the proportional gain KP or the integral gain KI beyond a certain amount, the gain at low frequencies cannot be made large, and as a result high accuracy control has been difficult.

Servo control technology directed towards mechanical systems having mechanical resonance is disclosed in Japanese Laid-Open Patent Publication 2000-322105. FIG. 8 illustrates a speed control device using this technology. The same reference numerals are used for members that are the same as in FIG. 6. In FIG. 8, reference numeral 12 is a filter inserted serially in the speed control loop and has a reverse characteristic or a proximately reverse characteristic to the anti-resonance/resonance characteristic of the mechanical system. This filter is adjusted to exhibit a characteristic such as that described in equation (1).

$$G(s) = \omega_1^2 (s^2 + 2\zeta_2 \omega_2 s + \omega_2^2) / \{\omega_2^2 (s^2 + 2\zeta_1 \omega_1 s + \omega_1^2)\} \tag{1}$$

Here, $\omega_1$, $\omega_2$, $\zeta_1$, and $\zeta_2$ each are parameters, $\omega_1$ has a value close to the anti-resonance frequency, and $\omega_2$ has a value close to the resonance frequency. $\zeta_1$ and $\zeta_2$ are arranged to be small, according to the anti-resonance and resonance peaks. According to this technology, since it is possible to restrain the gain of the resonance peak of the mechanical system by the filter 12, the gain can be raised more than in conventional cases, and high accuracy control can be realized.

However, this technology is mainly directed less at the resonance peak illustrated in FIG. 7, than at restraining the unstable resonance peak at higher frequencies, and it is inexpedient to apply this technology to stable resonance peaks such as in FIG. 7. The reason for this inexpediency is explained below.

FIG. 9 illustrates the frequency response of the filter 12 in cases where this technology is applied to a mechanical system having frequency response illustrated by the full lines in FIG. 7. Since the filter 12 is adjusted to have characteristics, the reverse of the anti-resonance/resonance characteristics of the mechanical system as described above, the gain characteristic has a peak at the anti-resonance of the mechanical system and has a trough at the resonance of the mechanical system. The case where the disturbing torque acts on the mechanical system controlled using this type of filter will be looked at. The resonance frequency is a frequency at which the mechanical system vibrates easily, and when the disturbing torque acts, the mechanical system may vibrate at the resonance frequency. This vibration is detected by the speed detection means 5 and is fed back to the speed control means 7; the speed control means 7 generates and outputs an electrical current command in order to stop this vibration. A signal component at the resonance frequency is, of course, included in this electrical current command. However, since the gain of the filter 12 becomes small at the resonance frequency as illustrated in FIG. 9, by passing through the filer 12, the signal component at the resonance frequency ends up being removed from the electrical current command. That is, the signal component for stopping the vibration ends up being removed, by the filter 12 from the electrical current. As a result, the disadvantage occurs that even when the mechanical system vibrates at the resonance frequency, the speed control system cannot stop this vibration.

As described above, when controlling a mechanical system of low rigidity and where the inertial moment J of the mechanical system is large in comparison to the inertial moment JM of the motor, there have been problems in that it is difficult to make the gain large at low frequencies with the conventional generally-used speed control device, and speed fluctuations due to disturbing torque become large so that high accuracy control is difficult.

Furthermore, the technology disclosed in Japanese Laid-Open Patent Publication 2000-322105 enables the gain to be made large at low frequencies but cannot stop mechanical vibration, so that it could not be applied to mechanical systems having mechanical vibration at low frequencies.

DISCLOSURE OF THE INVENTION

The present invention is directed at solving the above problems and has as an object the provision of a motor control device for controlling, stably and with high accuracy, a motor having a mechanical system having a resonance frequency and an anti-resonance frequency, and being linked to a mechanical load.

According to a first aspect of the invention, a motor control device for driving, based on a speed command signal, a motor coupled to a mechanical load associated with a mechanical system having a resonance frequency and an anti-resonance frequency, the motor control device having in a speed control loop detection speed of the motor, comprises: a speed control means for outputting a drive command signal for the motor so as to make the speed of the motor conform to the speed command signal, based on a signal indicating the difference between the speed command signal and the detection speed of the motor; and a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase is delayed in the intermediate frequency domain; wherein the speed control means includes a proportional controller for multiplying input by a proportional gain KP and outputting the result, as well as an integral controller for adding the value of the input multiplied by the proportional gain KP, and the integral of the input multiplied by an integral gain KI, and outputting the result; and filter settings are adjusted so that the phase of the filter is delayed at frequency domain between the resonance frequency and the anti-resonance frequency.

According to a second aspect of the invention, a motor control device for driving, based on a speed command signal, a motor coupled to a mechanical load associated with a mechanical system having a resonance frequency and an anti-resonance frequency, detected motor speed being available to the device in a speed control loop, comprises: a speed control means for outputting a drive command signal for the motor so as to make the speed of the motor conform to the speed command signal, based on a signal indicating the difference between the speed command signal and the detected speed of the motor; and a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase is delayed in the intermediate frequency domain; wherein the speed control means includes a proportional controller for multiplying input by a proportional gain KP and outputting the result, as well as an integral controller for adding the value of the input multiplied by the proportional gain KP, and the integral of the input multiplied by an integral gain KI, and outputting the result; and filter settings are adjusted so that the phase of the filter is delayed between a first crossover frequency $\omega_{C1}$, being the value obtained by dividing the product of the proportional gain KP and the gain KL by the inertial moment J of the mechanical system, and a second crossover frequency $\omega_{C2}$, being the value obtained by dividing the product of the proportional gain KP and the gain KH by the inertial moment JM of the motor.

According to a third aspect of the invention, a motor control device for driving, based on a speed command signal, a motor coupled to a mechanical load associated with a mechanical system having a resonance frequency and an anti-resonance frequency, detected motor speed being available to the device in a speed control loop, comprises: a speed control means for outputting a drive command signal for the motor so as to make the speed of the motor conform to the speed command signal, based on a signal indicating the difference between the speed command signal and the detected speed of the motor; and a filter inserted in series with the speed control means in the speed control loop, the filter having frequency-dependent phase lag characteristics with an approximately constant gain KL in a frequency domain lower than a first filter frequency $\omega_{F1}$, and an approximately constant gain KH, smaller than the gain KL, in a frequency domain higher than a second filter frequency $\omega_{F2}$, in which the phase is delayed between the first filter frequency $\omega_{F1}$ and the second filter frequency $\omega_{F2}$; wherein the speed control means has a proportional control computation means for multiplying input by a proportional gain KP and outputting the result, as well as a proportional integral control computation means for adding the value of the input multiplied by the proportional gain KP, and the integral of the input multiplied by an integral gain KI, and outputting the result; and filter settings are adjusted so that the ratio between an crossover frequency $\omega_{C1}$, being the value obtained by dividing the product of the proportional gain KP and the gain KL by the inertial moment J of the mechanical system, and the first filter frequency $\omega_{F1}$, is approximately constant.

According to a fourth aspect of the invention, a motor control device for drive-controlling a mechanical system, having a resonance frequency and an anti-resonance frequency, made up of a mechanical load coupled to a motor, the motor control device by means of a speed control loop drive-controlling detected speed of the motor based on a speed command signal, comprises: a filter inserted in series with a speed control means in the speed control loop, the filter having frequency-dependent phase lag characteristics in an intermediate frequency domain between a low frequency domain and a high frequency domain, with an approximately constant gain KL in the low frequency domain being lower than a first filter frequency $\omega F1$, and an approximately constant gain KH, smaller than the gain KL, in the high frequency domain being higher than a second filter frequency $\omega F2$; and a parameter setting means for setting parameters for the filter characteristics and the speed control means; wherein the speed control means has an integral controller for adding the value of the input multiplied by a proportional gain KP, and the integral of the input multiplied by an integral gain KI, and outputting the result; and filter settings are adjusted so that the ratio between an crossover frequency $\omega C1$, being the value obtained by dividing the product of the proportional gain KP and the gain KL by the inertial moment J of the mechanical system, and the first filter frequency $\omega F1$, is approximately constant, and so that the ratio between a zero-point frequency $\omega_{P1}$, being the value obtained by dividing the integral gain KI by the proportional gain KP, and the crossover frequency $\omega C1$ is approximately constant.

According to a fifth aspect of the invention, the motor control device according to claim 3 or 4, is furnished with a parameter setting means for setting parameters for the filter and the speed control means, wherein the parameter setting means sets the parameters so that, if an inertial ratio, being the value obtained by dividing the inertial moment J of the mechanical system by an inertial moment JM of the motor, is large, the ratio of the second filter frequency $\omega_{F2}$ to the first filter frequency $\omega_{F1}$ will be large.

According to a sixth aspect of the invention, the motor control device according to claim 3 or 4, is furnished with a parameter setting means for setting parameters for the filter and the speed control means, wherein the parameter setting means inputs to the filter a gain ratio, being the ratio between the gain KL and the gain KH, or a frequency ratio, being the ratio between the second filter frequency $\omega_{F2}$ and the first filter frequency $\omega_{F1}$, to set the parameters for the filter characteristics based on the gain ratio or the frequency ratio.

According to a seventh aspect of the invention, a motor control device for driving, based on a speed command signal, a motor coupled to a mechanical load associated with a mechanical system having a resonance frequency and an anti-resonance frequency, detected motor speed being available to the device in a speed control loop, comprises: a speed control means for outputting a drive command signal for the motor so as to make the speed of the motor conform to the speed command signal, based on a signal indicating the difference between the speed command signal and the detected speed of the motor; a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase in the intermediate frequency domain is delayed; a frequency response acquisition means for acquiring frequency response of the mechanical system; and a parameter setting means for setting characteristics of the filter; wherein the parameter setting means, based on the frequency response of the mechanical system acquired by the frequency response acquisition means, parameterizes the filter characteristics so that between the anti-resonance frequency and the resonance frequency of the mechanical system phase in the filter is delayed.

As described above, according to the first aspect of the invention, since the filter is set so that the phase is delayed between the resonance frequency and the anti-resonance frequency of the mechanical system, it is possible to enlarge the gain at low frequencies while maintaining the stability of the control system. By this means, the speed fluctuations due to the disturbing torque become small, and the effect is obtained of being able to realize high-accuracy control.

According to the second aspect of the invention, the setting is carried out so that the phase is delayed between the first crossover frequency $\omega C1$, being the value obtained by dividing the product of the proportional gain KP and the gain KL by the inertial moment J of the mechanical system, and the second crossover frequency $\omega C2$, being the value obtained by dividing the product of the proportional gain KP and the gain KL by the inertial moment JM of the motor system. In this way, since the increase in the phase lag at the first crossover frequency ωC1 and the second crossover frequency ωC2 becomes small, it is possible to make the gain at low frequencies large while maintaining the stability of the control system. By this means, the speed fluctuations due to the disturbing torque become small, and the effect is obtained of being able to realize high-accuracy control.

According to the third aspect of the invention, since the filter is set so that the ratio of the crossover frequency ωC1, being the value obtained by dividing the product of the proportional gain KP and the gain KL by the inertial moment J of the mechanical system, and the first filter frequency ωF1, is approximately constant, the increase in the phase lag at the first crossover frequency ωC1 becomes small, the stability is no longer weakened, and the effect is obtained that the control system does not vibrate or oscillate.

According to the fourth aspect of the invention, since the filter is set so that the ratio of the crossover frequency ωC1, being the value obtained by dividing the product of the proportional gain KP and the gain KL by the inertial moment J of the mechanical system, and the first filter frequency ωF1, is approximately constant, and also since the ratio of the zero-point frequency ωPI, being the value obtained by dividing the integral gain KI by the proportional gain KP, and the crossover frequency ωC1 is approximately constant, the phase lag at the first crossover frequency ωC1 does not become too large, and the effect is such that the stability of the control system can be ensured.

According to the fifth aspect of the invention, since the parameter setting means configures so that, when the inertial ratio, being the value obtained by dividing the inertial moment J of the mechanical system by the inertial moment JM of the motor, becomes large, the ratio of the second filter frequency ωF2 against the first filter frequency ωF1 is large, the increase in the phase lag at the second crossover frequency ωC2 becomes small, the stability is no longer weakened, and the effect is obtained that the control system does not vibrate or oscillate.

According to the sixth aspect of the invention, a gain ratio, being the ratio of the gain KL and the gain KH, or the frequency ratio, being the ratio of the second filter frequency ωF2 and the first filter frequency ωF1, is input to the parameter setting means, and the filter characteristics are set based on the gain ratio or the frequency ratio, so that even in cases where the mechanical system has a plurality of mechanical resonances, the phase lag at the first crossover frequency ωC1 or the second crossover frequency ωC2 does not become too large, and the effect is obtained of being able to enlarge the gain at low frequencies while maintaining stability.

According to the seventh aspect of the invention, the parameter setting means configures so that the filter phase is delayed between the anti-resonance frequency and the resonance frequency of the mechanical system based on the frequency response of the mechanical system acquired by the frequency response acquisition means, so that the phase lag of the filter is cancelled by the phase advance of the mechanical system. As a result, the phase lags at the first crossover frequency ωC1 and the second crossover frequency ωC2 do not become large, and even when the filter is inserted, the effect is obtained that the stability is no longer weakened.

BEST MODE FOR CARRYING OUT THE INVENTION

Embodiment 1

Figure 1:
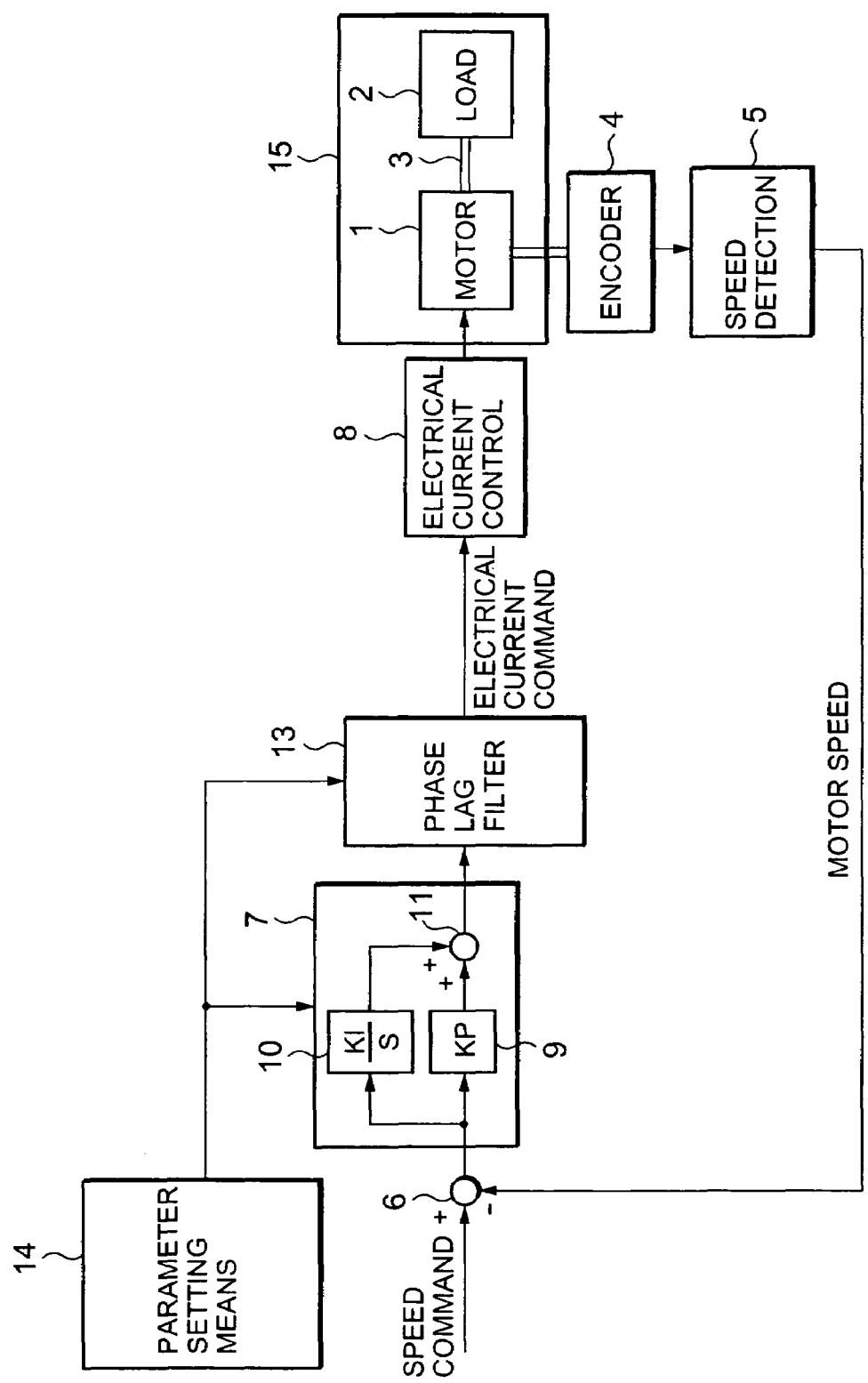
FIG. 1 is a block diagram illustrating a configuration of a control device for an embodiment of the present invention.

A first embodiment of the present invention is explained by referring to the configuration block diagram of a control device illustrated in FIG. 1.

In FIG. 1, identical reference numerals are used for members that are identical or equivalent to those in FIG. 1, and corresponding explanations are omitted. In the figure, reference numeral 1 denotes a motor, reference numeral 2 denotes a load driven by the motor, and reference numeral 3 denotes an axle connecting the motor 1 and the load 2. The load 2 represents a moveable member of a machine driven by the motor 1, modeled as one inertial load, and the axle 3 models a mechanism for transmitting torque, generated by the motor 1, to the machine. Reference numeral 4 denotes an encoder as a position detection means, attached to the motor 1, for detecting the position of the motor 1, reference numeral 5 denotes a speed detection means for computing the motor 1 speed by differentiating the motor position detected by the encoder 4. Reference numeral 6 is a comparator for comparing a speed command signal given by a high-level controller (not illustrated in the figure) with the detected speed (detected speed signal) of the motor 1, being the output of the speed detection means 5, and for outputting the difference between these two speeds as a speed error (speed signal deviation.) Reference numeral 7 is a speed control means that, with the speed error output by the comparator 6 as input, outputs an electrical current command that is a drive command signal for the motor 1. Reference numeral 8 is an electrical current control means that, by controlling the motor electrical current based on the electrical current command output by the speed control means 7, generates torque in the motor and rotates the motor 1.

The speed control means 7 is composed of a proportional controller 9, an integral controller 10, and an adder 11. The proportional controller 9 multiplies the input speed error by proportional gain KP and outputs the result; the integral controller 10 multiplies the integral value of the speed error by integral gain KI and outputs the result as the electrical current command. The adder 11 adds the proportional controller 9 output and the integral controller 10 output, and outputs the result as the electrical current command. Further, reference numeral 15 is a mechanical system having a resonance frequency and an anti-resonance frequency, and is comprised of the motor 1, the load 2 and the axle 3. Reference numeral 13 is a phase lag filter that is inserted serially with the speed control means 7 in the speed loop, and with the output of the speed control means 7 as its input, performs filtering computation and outputs an electrical current command; reference numeral 14 is a parameter setting means for setting characteristics of the phase lag filter and the integral gain KI that is a parameter of the speed control means.

Here, the speed loop is a loop formed from the speed control means 7, the phase lag filter 13, the electrical current control means 8, the motor 1, the encoder 4, and the speed detector 5.

Figure 2:
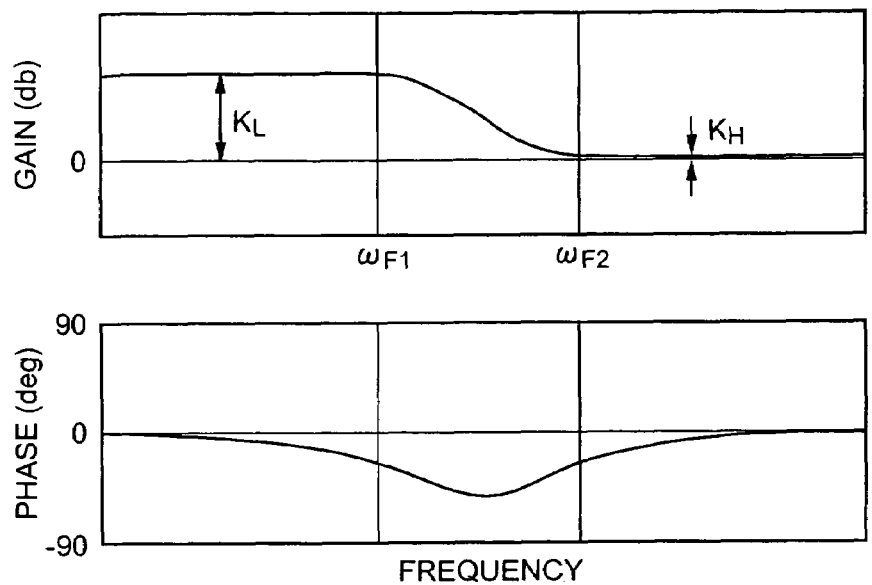
FIG. 2 is a graph illustrating frequency response of a phase lag filter, being an embodiment of the present invention.

The phase lag filter 13 is a filter having phase lag characteristics as illustrated in FIG. 2. That is, it has an approximately constant gain KL at frequencies below a first filter frequency $\omega F1$ (a low frequency domain); it has an approximately constant gain KH smaller than the gain KL above a second filter frequency $\omega F2$ (a high frequency domain); and its gain varies continuously between the first filter frequency $\omega F1$ and the second filter frequency $\omega F2$. In FIG. 2, KH=1=0 db. The phase characteristics are such that the phase is delayed between the first filter frequency $\omega F1$ and the second filter frequency $\omega F2$, and the phase lags are zero or have a low value at frequencies below the first filter frequency $\omega F1$ and above the second filter frequency $\omega F2$. A filter having these types of frequency response may be realized, for example, by a filter having a transfer function as given in equation (2).

$$Gf(s)=(s+\omega_2)/(s+\omega_1) \quad (2)$$

Here, $\omega_1=\omega F1$, $\omega_2=\omega F2$. However, $\omega_1<\omega_2$.

The first filter frequency $\omega F1$ and the second filter frequency $\omega F2$, which determine the characteristics of the phase lag filter 13, are set by the parameter setting means 14 as below. First, the first filter frequency $\omega F1$ and the second filter frequency $\omega F2$ are computed according to the equations below.

$$\omega c1=Kp \times KL/J \quad (3)$$

$$\omega c2=Kp \times KH/JM \quad (4)$$

Here, KP=proportional gain of the speed control means 7, KL=low frequency gain of the phase lag filter 13, KH=high frequency gain of the phase lag filter 13, J=inertial moment of the mechanical system 15, JM=inertial moment of the motor 1.

Equation (3) and equation (4) can be derived in the following way. At low frequencies below the anti-resonance frequency, the transfer function of the mechanical system 15 can approach 1/Js. Furthermore, since the gain of the phase lag filter 13 at low frequencies becomes KL, considering that the proportional gain of the speed control means 7 is KP, the speed open-loop transfer function at low frequencies approximates to KP×KL/Js. However, since the integral gain of the speed control means 7 is small, its influence is ignored. The frequency where this transfer function gain becomes 0 db is KP KL/J, and since this is the first crossover frequency $\omega C1$, equation (3) is obtained.

In the same way, the transfer function of the mechanical system 15 at high frequencies above the resonance frequency can be approximated to 1/JMs, and since the gain of the phase lag filter 13 at high frequencies is KH, the speed open-loop transfer function at high frequencies approximates to KP KH/JMs.

The frequency where this transfer function gain becomes 0 db is KP KH/JM, and since this is the second crossover frequency $\omega C2$, equation (4) is obtained. In the parameter setting means 14, the first filter frequency $\omega F1$ and the second filter frequency $\omega F2$ are set so that the phase at the phase lag filter 13 is delayed between the first crossover frequency $\omega C1$ and the second crossover frequency $\omega C2$ given by equation (3) and equation (4).

Figure 3:
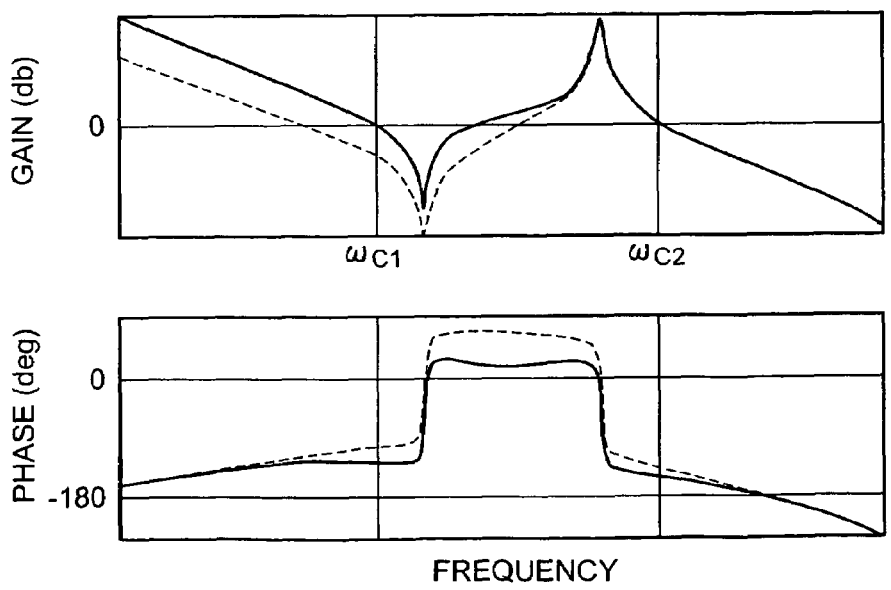
FIG. 3 is a graph illustrating frequency response of a speed open-loop according to the embodiment.

The speed open-loop frequency response for cases where the phase lag filter 13 is inserted in the speed loop in this way, and also for cases where it is not inserted, are compared in FIG. 3. In FIG. 3, the full line indicates the frequency response for cases where the phase lag filter 13 is inserted in the speed loop, and the broken line is for cases where it is not inserted. Since the phase lag filter 13 has a characteristic such that its gain is large at low frequencies, by inserting the phase lag filter 13 in the speed loop, it is known that the gain becomes large at low frequencies. Since, by making the gain large at low frequencies as described above, speed fluctuations due to disturbing torque become small, by inserting the phase lag filter 13, it becomes possible to realize good accuracy control.

Furthermore, in order to have the control system operating stably, it is necessary that the phase lags of the first crossover frequency $\omega C1$ and the second crossover frequency $\omega C2$ be small, as described above. Since, as in the phase lag filter 13 mentioned above, in order that the phase lags at the first crossover frequency $\omega C2$ and the second crossover frequency $\omega C2$ be small, the first filter frequency $\omega F1$ and the second filter frequency $\omega F2$ are set, the increase in the phase lag at the first crossover frequency $\omega C1$ and the second crossover frequency $\omega C2$ is small, and the stability of the control system is not weakened. That is, if the first filter frequency $\omega F1$ and the second filter frequency $\omega F2$ of the phase lag filter 13 are set by the parameter setting means 14 as described above, the stability of the control system is not weakened, the gain at low frequencies can be enlarged, and it becomes possible to realize high accuracy control.

Moreover, the exact value of the first crossover frequency $\omega C1$ and the second crossover frequency $\omega C2$ in FIG. 3 cannot be determined unless the speed open-loop frequency response are actually measured, but it is possible to perform approximate computations with equation (3) and equation (4).

Next, concrete processing contents of the parameter setting means 14 will be explained. First, so that the ratio of the first filter frequency $\omega F1$ and the first crossover frequency $\omega C1$ is approximately constant, the first filter frequency $\omega F1$ is set. As an example, the first filter frequency $\omega F1$ is set to be about 1~2 times the first crossover frequency $\omega C1$. As illustrated in FIG. 2, since the phase lag in the phase lag filter 13 becomes small at frequencies below the first filter frequency $\omega F1$, if the setting is performed in this way, the increase in the phase lag at the first crossover frequency $\omega C1$ becomes small, the stability is not weakened, and the control system does not vibrate or oscillate.

Next, when a inertial ratio, being the value obtained by dividing the inertial moment J of the mechanical system 15 by the inertial moment JM of the motor 1, becomes large, the second filter frequency $\omega F2$ is set so that the ratio of the second filter frequency $\omega F2$ to the first filter frequency $\omega F1$ becomes large. As an example, the second filter frequency $\omega F2$ is set to the product of the square root of the inertial ratio and the first filter frequency $\omega F1$. The second filter frequency ωF2 may be set to be about ½~1 times the second crossover frequency ωC2. By making the settings in this way, the second filter frequency ωF2 has a value of the same range or smaller than the second crossover frequency ωC2. As illustrated in FIG. 2, since the phase lag in the phase lag filter 13 becomes small at frequencies above the second filter frequency ωF2, if the setting is performed in this way the increase in the phase lag at the second crossover frequency ωC2 becomes small, the stability is not weakened, and the control system does not vibrate or oscillate.

Furthermore, the parameter setting means 14 sets the integral gain KI so that the ratio of the zero point frequency ωPI, being the value obtained by dividing the integral gain KI by the proportional gain KP in the speed control means 7, and the first crossover frequency ωC1 is approximately constant. For example, in order that the zero point frequency ωPI be ½ of the first crossover frequency ωC1, the following equation may be applied: KI=KP×ωC1/2. Since the size of the phase lag at the first crossover frequency ωC1 that arises in the integral controller 10 is decided by the ratio of the approximate zero point frequency ωPI and the first crossover frequency ωC1, if the ratio of the zero point frequency ωPI and the first crossover frequency ωC1 is appropriately set, the phase lag at the first crossover frequency ωC1 does not become too large, and it is possible to maintain the stability of the control system. That is, if the integral gain KI is set so that the ratio of the zero point frequency ωPI and the first crossover frequency ωC1 has an appropriate value, the integral gain KI can be made large within a range in which the stability of the control system is maintained, and the restraining effect on disturbances at low frequencies is enlarged.

Embodiment 2

Figure 4:
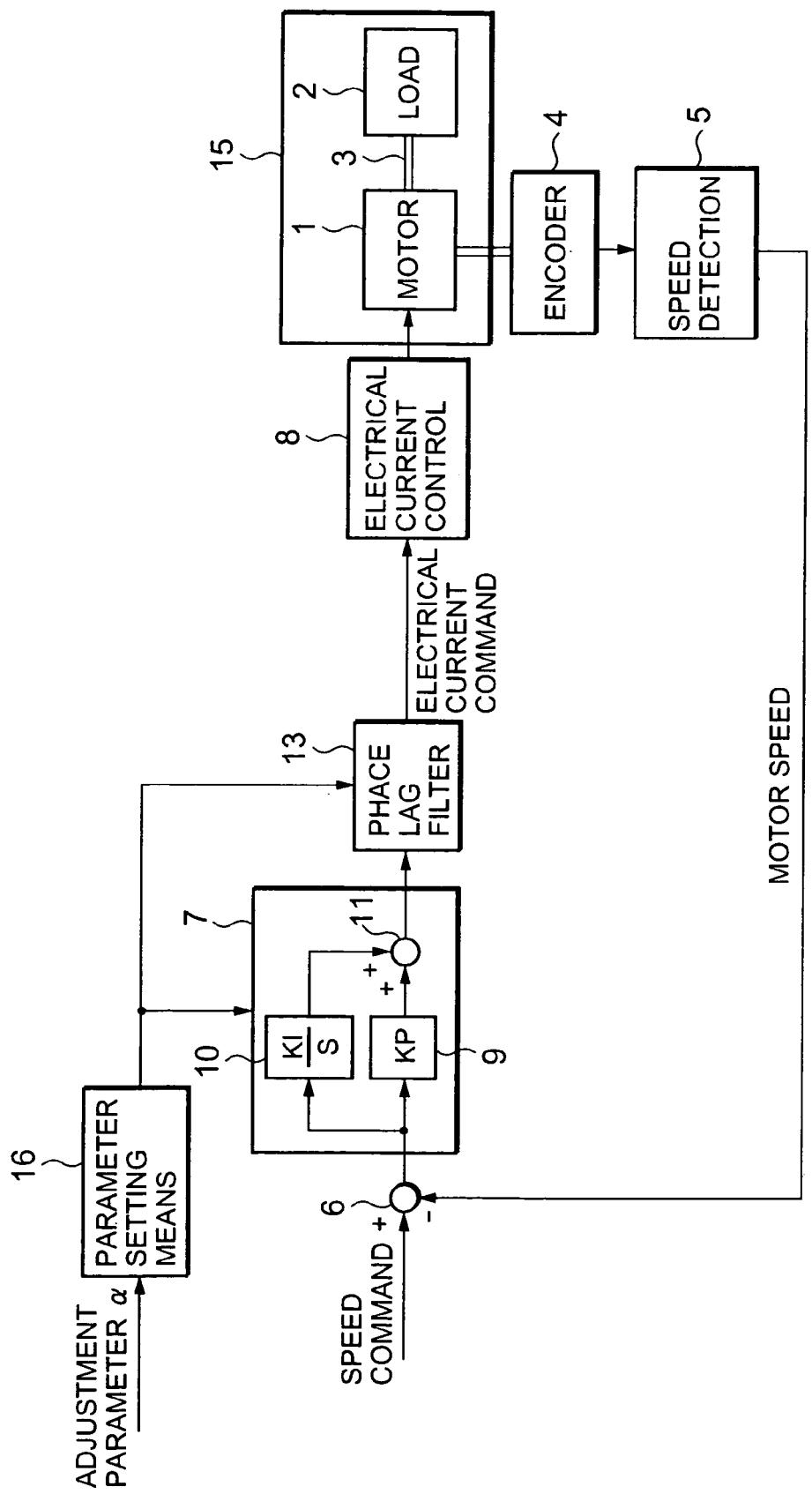
FIG. 4 is a block diagram illustrating a configuration of the control device according to another embodiment of the present invention.

FIG. 4 is a block diagram illustrating a configuration of the control device according to another embodiment of the present invention. Identical reference numerals are used for members that are identical to those in FIG. 1, and corresponding explanations are omitted. In FIG. 4, reference numeral 16 denotes a parameter setting means for setting characteristics for the phase lag filter and the integral gain KI, being a parameter for the speed control means; its operations are approximately the same as for the parameter setting means in FIG. 1 but one of the adjustment parameters a has to be input from outside.

This adjustment parameter a indicates the ratio of the gain KL against the gain KH at high frequencies, for the phase lag filter 13. In the parameter setting means 16, using the adjustment parameter α, with KL=α×KH, the first crossover frequency ωC1 is computed using the above equation (3). Further, as described above, the first filter frequency ωF1 is set so that the ratio of the first filter frequency ωF1 and the first crossover frequency ωC1 is approximately constant. The second filter frequency ωF2 is set so that KL=α×KH.

Regarding the way the adjustment parameter α is given, firstly α=1. The mechanical system is then operated, and while viewing its response characteristics, α is gradually increased. If a preferable response is obtained, or if mechanical vibration starts and the increasing of the parameter α is stopped, in cases where the preferable response is obtained, the value of α is fixed, and in cases where the vibration starts, α is made a little smaller and fixed. By providing the adjustment parameter α in this way, the gain can be enlarged at low frequencies while maintaining the stability of the control system, and restraining effects against disturbances can be increased. The reason for this is explained below.

First, when the adjustment parameter α is made large, since, by KL=α×KH, the gain KL becomes large at low frequencies in the phase lag filter, restraining effects against disturbances at low frequencies become large. Further, at this point, since the ratio of the first crossover frequency ωC1 and the first filter frequency ωF1 is made approximately constant, as described above, the phase lag at the first crossover frequency ωC1 does not become too large, and the gain at low frequencies can be made large while maintaining stability.

Further, the second filter frequency ωF2 is set so that the relationship between the gain KL at low frequencies and the gain KH at high frequencies, for the phase lag filter 13, is such that KL=α×KH. As will be understood by looking at the filter characteristics in FIG. 2, in order to enlarge α, being the ratio of the gain KL at low frequencies to the gain KH at high frequencies, it is necessary to enlarge the ratio of the second filter frequency ωF2 to the first frequency ωF1. When α is made large, from KL=α×KH, KL becomes large; and with this, by equation (3), the first crossover frequency ωC1 becomes large, and furthermore, since the ratio of the first crossover frequency ωC1 and the first filter frequency ωF1 becomes approximately constant, the first filter frequency ωF1 becomes large, and therefore, the second filter frequency ωF2 also becomes large. When the first filter frequency ωF1 and the second filter frequency ωF2 become large, since the frequency range in which the phase in the phase lag filter 13 is delayed moves to the high frequency side, the phase lag for the second crossover frequency ωC2 becomes large.

In this way, when the adjustment parameter α is gradually enlarged from 1, the phase lag at the second crossover frequency ωC2 correspondingly becomes larger, little by little. However, if the phase lag at the second crossover frequency ωC2 becomes too large, the mechanical system begins to vibrate, and this can be seen by looking at the response of the mechanical system.

Therefore, if the value of α is set to be a little smaller than that at which the vibration of the mechanical system starts, the phase lag at the second crossover frequency ωC2 also does not become too large. In this way, the characteristics of the phase lag filter 13 can be set so that the phase lags at both the first crossover frequency ωC1 and the second crossover frequency ωC2 do not become large, and the stability of the control system can be maintained.

The parameter setting means 14 for the speed control device in Embodiment 1, illustrated in FIG. 1, operates effectively for cases where the mechanical system has a resonance/anti-resonance set. However, according to the mechanical system, it may have other resonance/anti-resonance characteristics at higher frequencies, and for such mechanical systems it is difficult to accurately compute the second crossover frequency ωC2. In such cases, rather than compute the second filter frequency ωF2 and automatically perform setting, more preferable characteristics can be effectively obtained by performing the setting while viewing the response of the mechanical system using the adjustment parameter α.

Furthermore, in the above description the adjustment parameter α indicates the gain ratio, being the ratio of the gain KL at low frequencies to the gain KH at high frequencies for the phase lag filter 13; however, it may also indicate the frequency ratio, being the ratio of the second filter frequency ωF2 and the first filter frequency ωF1. The relationship between the gain ratio and the frequency ratio is decided by the transfer function of the phase lag filter 13, so that the same effect is obtained whether the gain ratio is indicated or the frequency ratio is indicated.

Embodiment 3

Figure 5:
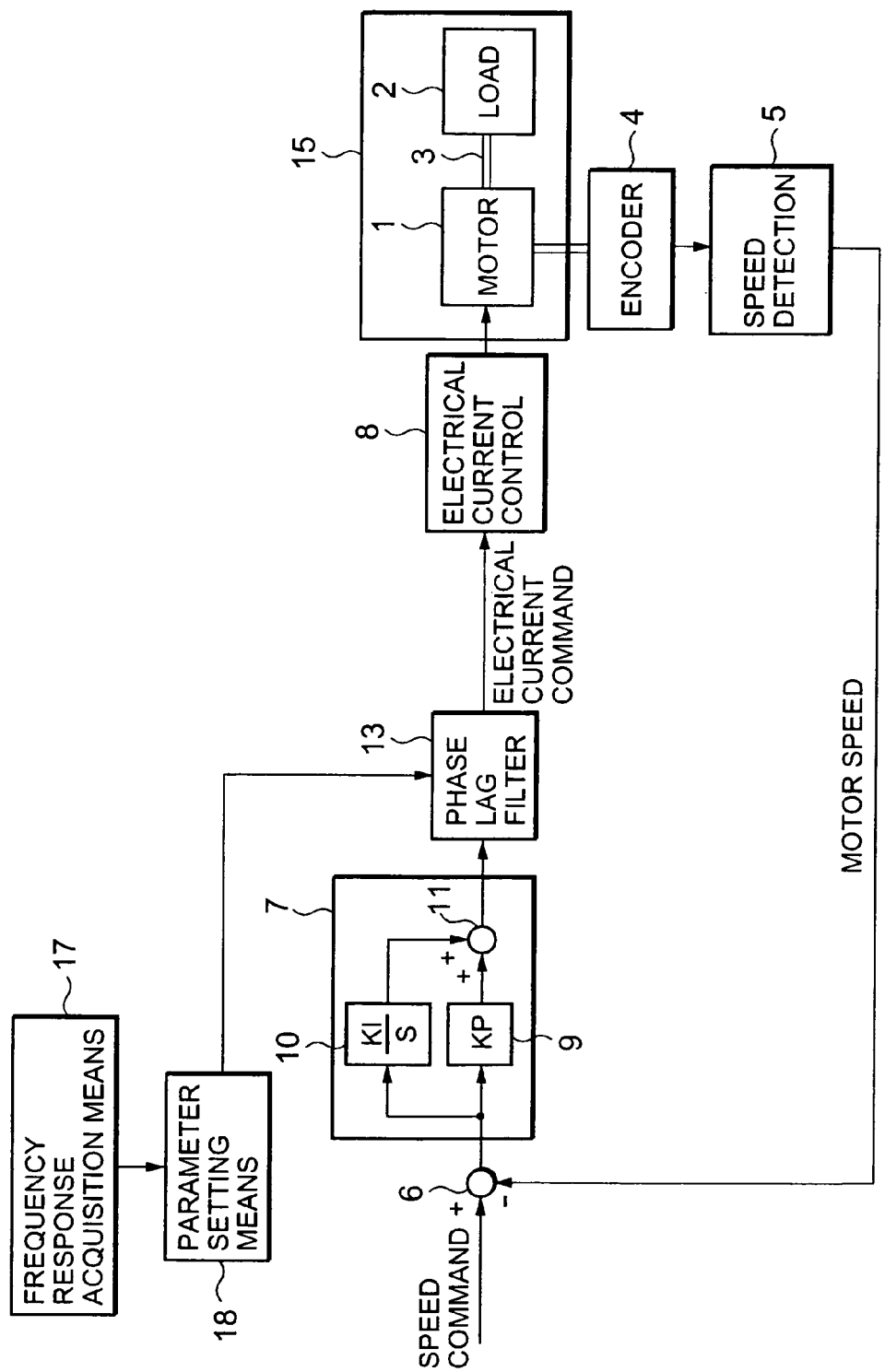
FIG. 5 is a block diagram illustrating a configuration of the control device according to another embodiment of the present invention.
Figure 6:
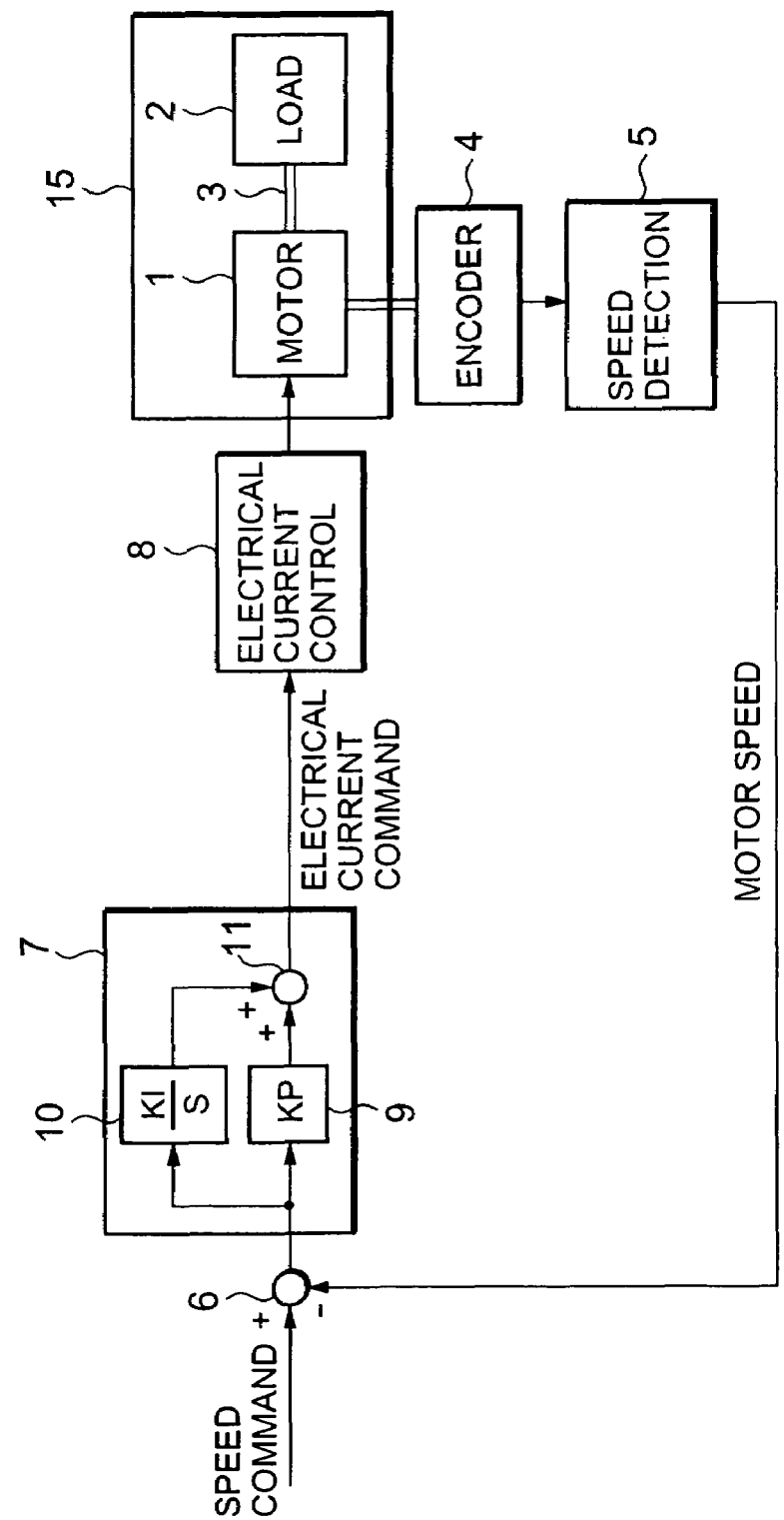
FIG. 6 is a block diagram illustrating a configuration for a conventional speed control device.

FIG. 5 is a block diagram illustrating a configuration of the control device according to another embodiment of the invention. The same reference numerals are used for members as in FIG. 1. In FIG. 5, reference numeral 17 denotes a frequency response acquisition means for acquiring frequency response of the mechanical system, reference numeral 18 denotes the parameter setting means for setting the characteristics of the phase lag filter; and the characteristics of the phase lag filter are set based on the frequency response of the mechanical system acquired by the frequency response acquisition means 17.

Several methods are known for acquiring the frequency response of the mechanical system by the frequency response acquisition means 17. Measurement may be performed using a specialized measurement device, or the motor may be driven at random torques and a frequency analysis can be carried out on the corresponding speed response. Further, in cases where the rigidity, mass, inertial moment, and the like, for the mechanical system, are known, a numerical model is made using these, and the computation can be performed. A result, such as the frequency response indicated by the full line in FIG. 7, can be obtained. In the parameter setting means 18, based on the frequency response of the mechanical system acquired in this way, the characteristics of the phase lag filter 13 are set so that the phase of the phase lag filter 13 is delayed between the anti-resonance frequency and the resonance frequency of the mechanical system. To do this, the first filter frequency $\omega F1$ of the phase lag filter is set in the neighborhood of the anti-resonance frequency and the second filter frequency $\omega F2$ is set in the neighborhood of the resonance frequency.

Figure 7:
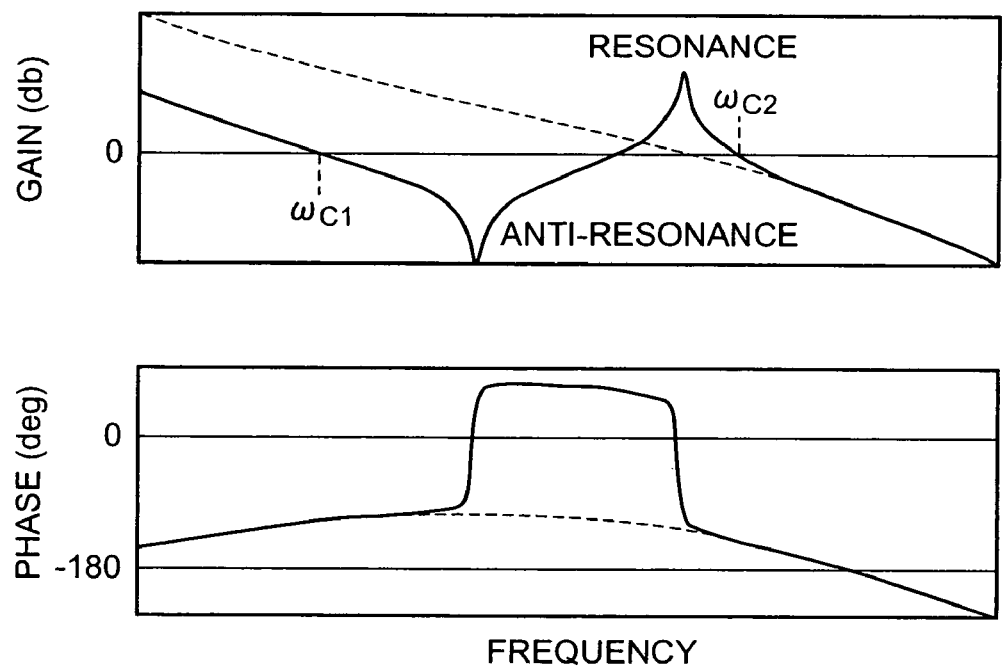
FIG. 7 is a graph illustrating frequency response of a speed open-loop applied to the conventional speed control device.
Figure 8:
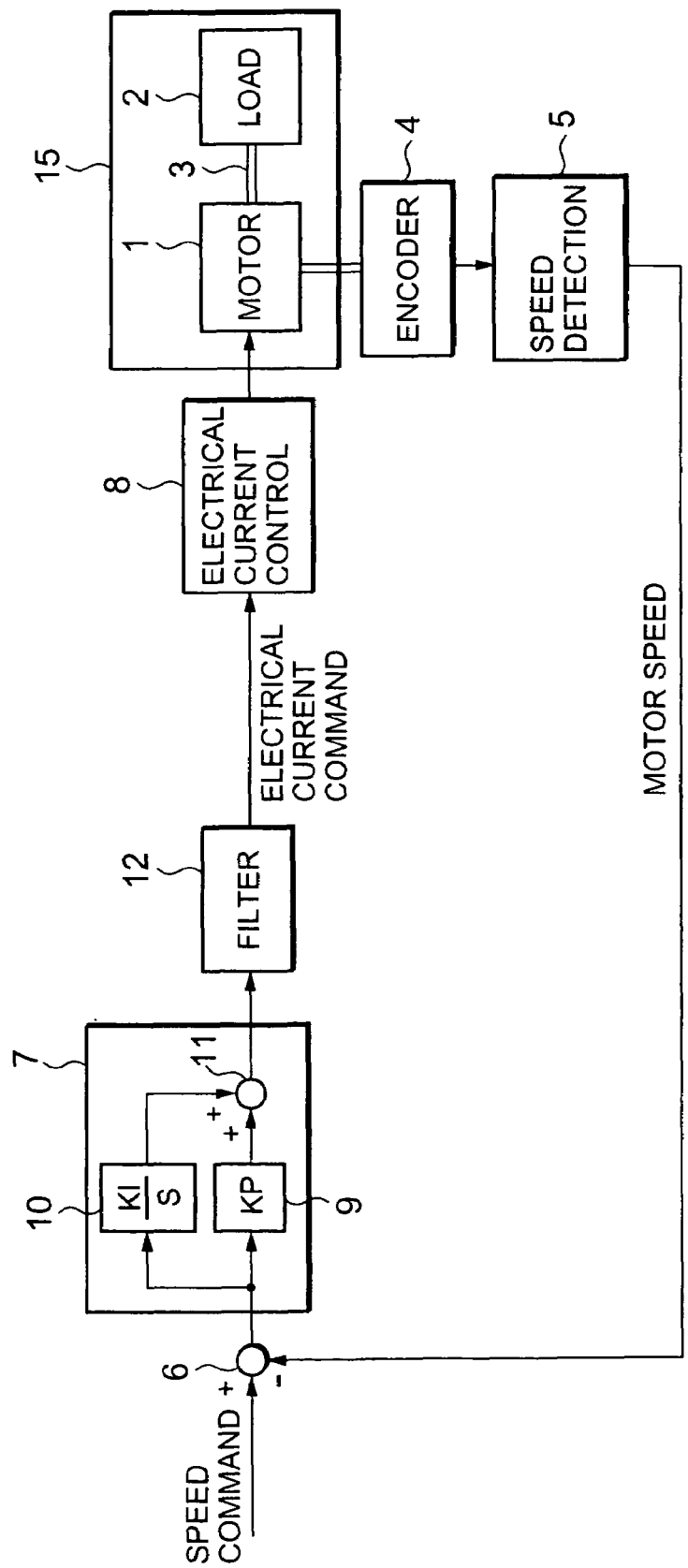
FIG. 8 is a block diagram illustrating a configuration for the conventional speed control device for a mechanical system having a mechanical resonance.
Figure 9:
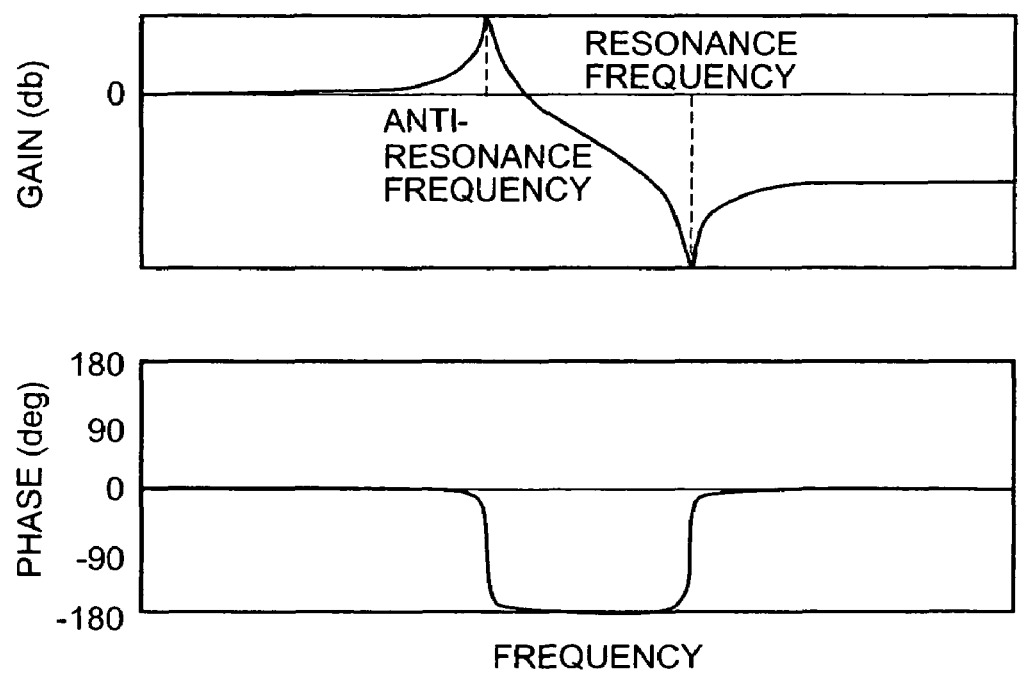
FIG. 9 is a graph illustrating frequency response of a filter used in the conventional technology.

As illustrated by the full line in FIG. 7, the frequency response of the mechanical system having mechanical resonance has a characteristic such that the phase is advanced between the anti-resonance frequency and the resonance frequency. Therefore, if the setting is such that the phase of the phase lag filter 13 is delayed between the anti-resonance frequency and the resonance frequency, as described above, the phase lag of the phase lag filter is cancelled by the phase advance of the mechanical system. Thus, the phase lags at the first crossover frequency $\omega C1$ and the second crossover frequency $\omega C2$ do not enlarge, and even when the phase lag filter 13 is inserted, the stability is no longer weakened.

INDUSTRIAL APPLICABILITY

The above described invention may be applied to control systems where the inertial moment of a mechanical system driven by a motor is large in comparison to the inertial moment of the motor itself.

What is claimed is:

1. A motor control device for driving, based on a speed command signal, a motor coupled to a mechanical load associated with a mechanical system having a resonance frequency and an anti-resonance frequency, the motor control device having in a speed control loop detection speed of the motor, and comprising:

a speed control means for outputting a drive command signal for the motor so as to make the speed of the motor conform to the speed command signal, based on a signal indicating the difference between the speed command signal and the detection speed of the motor; and a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase is delayed in the intermediate frequency domain; wherein the speed control means includes a proportional controller for multiplying input by a proportional gain KP and outputting the result, as well as an integral controller for adding the value of the input multiplied by the proportional gain KP, and the integral of the input multiplied by an integral gain KI, and outputting the result; and filter settings are adjusted so that frequency the phase of the filter is delayed at frequency domain between the resonance frequency and the anti-resonance.

2. A motor control device for driving, based on a speed command signal, a motor coupled to a mechanical load associated with a mechanical system having a resonance frequency and an anti-resonance frequency, detected motor speed being available to the device in a speed control loop, the motor control device comprising:

a speed control means for outputting a drive command signal for the motor so as to make the speed of the motor conform to the speed command signal, based on a signal indicating the difference between the speed command signal and the detected speed of the motor; and a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase in the intermediate frequency domain is delayed; wherein the speed control means includes a proportional controller for multiplying input by a proportional gain KP and outputting the result, as well as an integral controller for adding the value of the input multiplied by the proportional gain KP, and the integral of the input multiplied by an integral gain KI, and outputting the result; and filter settings are adjusted so that the phase is delayed when the speed command signal is between a first crossover frequency $\omega_{C1}$, being the value obtained by dividing the product of the proportional gain KP and the gain KL by the inertial moment J of the mechanical system, and a second crossover frequency $\omega_{C2}$, being the value obtained by dividing the product of the proportional gain KP and the gain KH by the inertial moment JM of the motor.

3. A motor control device for driving, based on a speed command signal, a motor coupled to a mechanical load associated with a mechanical system having a resonance frequency and an anti-resonance frequency, detected motor speed being available to the device in a speed control loop, the motor control device comprising:

a speed control means for outputting a drive command signal for the motor so as to make the speed of the motor conform to the speed command signal, based on a signal indicating the difference between the speed command signal and the detected speed of the motor; and a filter inserted in series with the speed control means in the speed control loop, the filter having frequency-dependent phase lag characteristics with an approximately constant gain KL in a frequency domain lower than a first filter frequency $\omega_{F1}$, and an approximately constant gain KH, smaller than the gain KL, in a frequency domain higher than a second filter frequency $\omega_{F2}$, in which the phase is delayed between the first filter frequency $\omega_{F1}$ and the second filter frequency $\omega_{F2}$; wherein the speed control means has a proportional control computation means for multiplying input by a proportional gain KP and outputting the result, as well as a proportional integral control computation means for adding the value of the input multiplied by the proportional gain KP, and the integral of the input multiplied by an integral gain KI, and outputting the result; and filter settings are adjusted so that the ratio between an crossover frequency $\omega_{C1}$, being the value obtained by dividing the product of the proportional gain KP and the gain KL by the inertial moment J of the mechanical system, and the first filter frequency $\omega_{F1}$, is approximately constant.

4. A motor control device for drive-controlling a mechanical system, having a resonance frequency and an anti-resonance frequency, made up of a mechanical load coupled to a motor, the motor control device by means of a speed control loop drive-controlling detected speed of the motor based on a speed command signal, and comprising:

a filter inserted in series with a speed control means in the speed control loop, the filter having frequency-dependent phase lag characteristics in an intermediate frequency domain between a low frequency domain and a high frequency domain, with an approximately constant gain KL in the low frequency-domain being lower than a first filter frequency ωF1, and an approximately constant gain KH, smaller than the gain KL, in the high frequency domain being higher than a second filter frequency ωF2; and a parameter setting means for setting parameters for the filter characteristics and the speed control means; wherein the speed control means has an integral controller for adding the value of the input multiplied by a proportional gain KP, and the integral of the input multiplied by an integral gain KI, and outputting the result; and filter settings are adjusted so that the ratio between an crossover frequency ωC1, being the value obtained by dividing the product of the proportional gain KP and the gain KL by the inertial moment J of the mechanical system, and the first filter frequency ωF1, is approximately constant, and so that the ratio between a zero-point frequency $\omega_{P1}$, being the value obtained by dividing the integral gain KI by the proportional gain KP, and the crossover frequency ωC1 is approximately constant.

5. The motor control device according to claim 3, being furnished with a parameter setting means for setting parameters for the filter and the speed control means, wherein the parameter setting means sets the parameters so that, if an inertial ratio, being the value obtained by dividing the inertial moment J of the mechanical system by an inertial moment JM of the motor, is large, the ratio of the second filter frequency $\omega_{F2}$ to the first filter frequency $\omega_{F1}$ will be large.

6. The motor control device according to claim 4, being furnished with a parameter setting means for setting parameters for the filter and the speed control means, wherein the parameter setting means inputs to the filter a gain ratio, being the ratio between the gain KL and the gain KH, or a frequency ratio, being the ratio between the second filter frequency $\omega_{F2}$ and the first filter frequency $\omega_{F1}$, to set the parameters for the filter characteristics based on the gain ratio or the frequency ratio.

7. A motor control device according to claim 3 for driving, based on a speed command signal, a motor coupled to a mechanical load associated with a mechanical system having a resonance frequency and an anti-resonance frequency, detected motor speed being available to the device in a speed control loop, the motor control device comprising:

a speed control means for outputting a drive command signal for the motor so as to make the speed of the motor conform to the speed command signal, based on a signal indicating the difference between the speed command signal and the detected speed of the motor;

a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase in the intermediate frequency domain is delayed;

a frequency response acquisition means for acquiring frequency response of the mechanical system; and a parameter setting means for setting characteristics of the filter; wherein the parameter setting means, based on the frequency response of the mechanical system acquired by the frequency response acquisition means, parameterizes the filter characteristics so that between the anti-resonance frequency and the resonance frequency of the mechanical system phase in the filter is delayed.

8. The motor control device according to claim 4, being furnished with a parameter setting means for setting parameters for the filter and the speed control means, wherein the parameter setting means inputs to the filter a gain ratio, being the ratio between the gain KL and the gain KH, or a frequency ratio, being the ratio between the second filter frequency WF2 and the first filter frequency WFZ, to set the parameters for the filter characteristics based on the gain ratio or the frequency ratio.

9. A motor control device for driving, based on a speed command signal, a motor coupled to a mechanical load associated with a mechanical system having a resonance frequency and an anti-resonance frequency, detected motor speed being available to the device in a speed control loop, the motor control device comprising:

a speed control means for outputting a drive command signal for the motor so as to make the speed of the motor conform to the speed command signal, based on a signal indicating the difference between the speed command signal and the detected speed of the motor;

a filter inserted in series with the speed control means in the speed control loop, the filter having frequency-dependent phase lag characteristics divided into a high frequency domain, a low frequency domain, and an intermediate frequency domain between the high frequency domain and the low frequency domain, and in which the gain KL in the low frequency domain is larger than the gain KH in the high frequency domain, and in which the phase in the intermediate frequency domain is delayed;

a frequency response acquisition means for acquiring frequency response of the mechanical system; and a parameter setting means for setting characteristics of the filter; wherein the parameter setting means, based on the frequency response of the mechanical system acquired by the frequency response acquisition means, parameterizes the filter characteristics so that between the anti-resonance frequency and the resonance frequency of the mechanical system phase in the filter is delayed.

* * * * *